United States Patent

Hammel et al.

[15] 3,650,721
[45] Mar. 21, 1972

[54] METHOD OF FORMING MICROPOROUS GLASS FIBERS

[72] Inventors: Joseph J. Hammel, Pittsburgh, Pa.; John D. Mackenzie, Schenectady, N.Y.

[73] Assignee: PPG Industries, Inc., Pittsburgh, Pa.

[22] Filed: May 6, 1969

[21] Appl. No.: 822,325

Related U.S. Application Data

[63] Continuation-in-part of Ser. No. 736,670, June 13, 1968, abandoned.

[52] U.S. Cl. .................................................. 65/31, 65/2
[51] Int. Cl. ............................................................ C03c 25/06
[58] Field of Search ................ 65/31, 2; 117/124; 131/261, 131/262, 263, 264, 265, 266, 267

[56] References Cited

UNITED STATES PATENTS

| 2,834,738 | 5/1958 | Vincent | 65/31 X |
| 2,106,744 | 2/1938 | Hood et al. | 65/31 |
| 2,313,343 | 3/1943 | Jacob | 131/261 R |
| 2,327,991 | 8/1943 | Betts | 131/4 A |
| 2,461,841 | 2/1949 | Nordberg | 65/31 |
| 3,275,428 | 9/1966 | Siegmund | 65/31 |
| 3,412,737 | 11/1968 | Pinter | 131/267 |
| 3,463,168 | 8/1969 | Troll et al. | 131/262 B |

*Primary Examiner*—Arthur D. Kellogg
*Attorney*—Chisholm and Spencer

[57] ABSTRACT

This invention relates to a process for forming small particles of microporous glass having inter-connected pores suitable to filter tobacco smoke. It particularly relates to a method of melting a phase-separable borosilicate glass composition, especially alkali borosilicates, forming the glass into a workable form, especially fibers, at elevated temperatures, phase separating the glass by heat treatment at elevated temperatures below the miscibility temperature of the glass for a sufficient period to form a silica-rich phase and a substantially continuous borate-rich phase, cooling the phase-separated glass, sizing the phase-separated glass, and leaching the glass to remove a sufficient quantity of the borate-rich phase to form microporous articles having inter-connected pores.

6 Claims, No Drawings

METHOD OF FORMING MICRO-POROUS GLASS FIBERS

BACKGROUND OF THE INVENTION

This application is a continuation-in-part of U.S. application Ser. No. 736,670, filed June 13, 1968, now abandoned, describing tobacco smoke filters comprised of microporous glass particles having interconnecting pores.

The present invention claims a novel process for forming particles of microporous glass suitable for use as a tobacco smoke filter.

Patent application Ser. No. 736,670 describes a method of forming small particles of microporous glass wherein an alkali borosilicate composition is melted, formed in sheets, phase separated while in sheet form, and subsequently leached to form a sheet of glass having interconnecting micropores. To form particles of suitable size for use in tobacco smoke filters, the microporous glass sheets were crushed and sized. This method produced microporous glass particles suitable for use as tobacco smoke filters but was disadvantageous in consuming very long periods of time for leaching of the glass in sheet form.

INVENTION

It has now been discovered that microporous glass having interconnecting pores useful as tobacco smoke filters can be advantageously formed by:

a. melting a phase-separable metal borosilicate glass composition, especially alkali borosilicate compositions, b. forming the glass into a workable form at elevated temperatures, the workable form being sheets, rods, tubes, or fibers, for example, c. phase separating the glass by treatment at elevated temperatures, preferably from about 450° C. to about 750° C. or higher, but below the miscibility temperature of the glass, for a sufficient period of time to form a silica-rich phase and substantially continuous borate-rich phase, d. cooling the phase-separated glass, e. sizing the phase-separated glass to a desirable size, for example, granules, fibers, etc., having a minor axis length of 0.5 to 1,000 microns and, preferably from 100 to 500 microns for granules, and about 1 to 20 microns for fibers, and f. leaching the glass to remove a sufficient quantity of the borate-rich phase to form microporous particles having interconnecting pores.

In U.S. Pat. No. 2,106,744, the leaching or porous glass sheets was conducted in an acid bath of a temperature of approximately 98° C. for at least 1 day for each millimeter of glass thickness. In the present invention, it has been found that sufficient leaching of the glass may be conducted by treatment with an acid at temperatures between 70° and 200°C. in about 2 hours or less with leaching of fibers of about 0.5 to about 20 microns diameter being accomplished in a few minutes, e.g., 5 minutes or less. Leaching is accomplished by use of an inorganic acid in concentrated form. Hydrochloric, nitric, and sulfuric acids are preferred.

Typical compositions useful in the process of the instant invention include metal borosilicates having generally less than about 20 percent by weight metal oxide, especially soda and potassia, about 60 to 90 percent by weight silica, and 10 to 40 percent by weight boric acid. Preferred compositions comprise about 5 to 10 percent by weight alkali metal oxide, about 15 to 30 percent by weight boric oxide, and about 70 to 85 percent by weight silica. Such glasses may be formed from alkali metals such as sodium, potassium, or lithium, from alkaline earth metals such as calcium, strontium, barium, and the like, and from other metals such as lead, zinc, titanium, and the like.

A typical process for forming small, that is, particles of less than 1,000 microns in diameter, micro-porous glass particles suitable for tobacco smoke filters comprises melting a phase-separable borosilicate glass composition, especially alkali borosilicate compositions, forming the glass into a sheet or rod, and heat treating the glass without allowing it to cool to phase separate a silica-rich phase from a borate-rich phase of a substantially continuous nature. The heat treatment is preferably carried out at temperatures of about 450° to about 750° C. for a period of one hour or more. Heat treating at higher temperatures for longer periods of time tends to agglomerate the borate-rich phase and, upon leaching, provides a structure having larger pores than articles treated at lower temperatures for shorter periods of time. In any event, the heat treatment is carried out below the miscibility temperature of the glass. The miscibility temperature may bee readily determined by heating a translucent, phase-separated glass at successively high temperatures and observing the temperature at which the translucent appearance ceases, which indicates the presence of only one phase.

The heat treated glass is cooled and crushed to size, although it is preferred to crush to a slightly larger size than desired for tobacco smoke filter particles inasmuch as some fragmentation occurs during the leaching step. The glass is then leached in an acid which dissolves the borate-rich phase, for example, hydrochloric acid, sulfuric acid, or combinations thereof, at temperatures above room temperature for a period sufficient to remove substantially all the borate-rich phase.

The resulting microporous particles having interconnecting pores of a diameter of about 10 angstroms to about 1,000 angstroms are thoroughly washed to remove trapped acids and residue.

The method of this invention is particularly useful for forming microporous glass fibers uniquely useful in tobacco smoke filters. A phase-separable glass composition such as the borosilicates, especially alkali metal borosilicates, preferably containing about 5 to 10 percent by weight alkali metal oxide, especially soda and potassia, 15 to 30 percent by weight boric oxide, and about 70 to 85 percent by weight silica, is melted and fritted. The fritted glass is then remelted, generally at temperatures of about 1,204.4° C. to about 1,482.2° C. although higher or lower temperatures may be utilized inasmuch as the melting temperature will vary with glass composition. The molten glass is held at the melting temperature for a period of time sufficient to fine the glass, generally about 20 minutes to about 2 hours. The temperature of the glass is then lowered so that its temperature at the bushing provides the proper viscosity for drawing of fibers. The fiber drawing temperature will generally range from about 27.8° C. to about 194.4° C. below the melting temperature of the glass. For the above preferred composition, a drawing temperature of about 1,260° C. ± 27.8° is preferred. Glass fibers are then drawn through the bushing at the bottom of the crucible containing the molten glass.

The size of fibers drawn depends upon the drawing speed which is partially dependent upon temperature since temperature affects viscosity and the bushing orifice is of a larger diameter than typical fiber diameters. A typical temperature range for drawing metal borosilicate glasses ranges from about 982.2° C. to about 1,648.9° C. and, preferably, from about 1,148.9° C. to about 1,315.6° C. The metal borosilicate glasses of this invention have a flat viscosity curve over a board temperature range, thereby permitting drawing of fibers over a wide temperature range. Drawing speeds at these temperatures may range from 2,000 feet per minute to 20,000 feet per minute, preferably from about 5,000 feet per minute to 15,000 feet per minute, with fiber diameters ranging from 0.5 microns at the faster drawing speeds to about 20 microns at slower rates of draw.

If the glass drawn is too seedy to allow drawing of fine fibers, then a thicker fiber, e.g., 20 microns, may be drawn and then attenuated to a small diameter, e.g., 0.5 to 5 microns, by drawing through a flame. Other attenuating processes involving steam, hot air, etc., are also useful.

A flame temperature of 1,648.9° to 2,093.3° C. is preferred for flame attenuation at a fiber rate of about 600 to 1,000 feet per second. This approach has proved useful in the instant invention in forming small diameter fibers from compositions which do not contain fining agents or alkaline earth oxides.

Fibers of phase-separable glasses, especially borosilicate glasses containing alkali metal oxides, alkaline earth oxides, or oxides of lead, zinc, titanium, zirconium, and the like, may be heat treated at elevated temperatures to induce phase separation. Temperatures from about 450° C. to about 750° C., preferably about 550° C. to about 680° C., have been found useful for this purpose. The period of heat treatment to induce phase separation for fibers may range from less than about 3 minutes to about 4 hours or more, with the longer time periods required at the lower temperatures. For example, at temperatures of about 627° C., heat treatments of about 5 to 30 minutes were found to phase separate the glass very satisfactorily.

Fibers may be preferably cut into lengths of a few inches to several feet or more and formed into bundles or mats for heat treatment. Such bundles or mats can be easily formed in a water bath although dry bundling is effective. A loose arrangement such as bundles or mats provides better heat transfer to each fiber than would be achieved in close packing such as occurs on spools. Also, leaching proceeds at a much faster rate for loosely packed fibers. It is significant that the fibers do not fuse together at the heat treating temperatures inasmuch as U.S. Pat. No. 2,461,841 indicates that fibers of alkali borosilicate glasses cannot be treated at such temperatures.

Leaching may be preferably conducted for fibers by treating in concentrated inorganic acids such as hydrochloric, sulfuric, and nitric, i.e., a normality of from about 1 to about 6, for a period of about 3 minutes to about 60 minutes, at a temperature of from about 70° C. to about 200° C.

Fibers heat treated and leached in the above-described manner are microporous in nature having interconnecting pores of about 40 angstroms in diameter to about 1,000 angstroms. The larger pore diameters require longer heat treatment at temperatures in the upper portion of the heat treatment range. Pore diameters of about 40 angstroms to about 250 angstroms may be obtained readily by heat treating at about 570° C. to about 630° C. for about 5 minutes to about 300 minutes.

Microporous fibers produced in the above-described manner have surface areas generally in excess of 100 square meters per gram as determined by nitrogen absorption according to the method described by Emmett, Brunauer, and Teller in *Journal of the American Chemical Society*, 56, 35 (1934) and 57, 1954 (1935).

These fibers have a pore volume of from about 5 percent to about 30 percent, depending upon composition, degree of phase separation, and leaching conditions. A pore volume of 25 to 30 percent is readily attainable with the above-described compositions and processing conditions.

Although the above description emphasizes processing of individual bundles or mats of fibers, and especially thin mats of about 2 mil thickness, continuous treatment of continuous strands of fibers is feasible and for some operations may be preferable. Fibers may be drawn at high speeds onto spools; fibers drawn from many spools may be fed in strands at a desired rate through a heat-treating furnace and into a leaching bath in a continuous manner. The fibers can then be washed and again placed on spools or fed directly into an apparatus for bundling, cutting, and assembling of the fibers into filters for cigarettes, pipes, and the like.

Fiberizing is an especially effective method of forming microporous glass tobacco smoke filters from alkaline earth borosilicates and borosilicates of lead, zinc, titanium, zirconium, and the like, since these glasses tend to phase separate upon cooling unless the cooling is extremely rapid. The most effective means of cooling occurs when fine, i.e., about 0.5 to about 20 microns thick, fibers are drawn. Because of the thinness of the fibers, the whole mass of the fiber reaches ambient temperature very rapidly.

Glasses which phase separate upon cooling have been found generally to have fewer interconnecting pores than glasses which are phase separated by a controlled heat treatment. The quantitative presence of interconnecting pores can be determined readily by measuring the weight loss rate during leaching, and by the appearance of the glass under an electron microscope and nitrogen area measurements of interconnecting pores. If a phase-separated glass does not possess an interconnecting or continuous phase, weight is lost very slowly during leaching and the total weight loss is considerably less than in phase-separated glasses having a continuous phase.

Fiberizing of alkaline earth borosilicates and borosilicates containing lead, zinc, titanium, zirconium, and the like, provides fibers of one phase which may then be phase separated by controlled heat treatment to obtain a glass fiber having a silica-rich phase and a continuous borate-rich phase. The heat treating can be conducted as described above. The resulting phase-separated fiber may be leached in the manner described hereinabove to give a microporous glass having interconnecting pores of a diameter of about 40 angstroms to about 1,000 angstroms.

Other glass-forming ingredients, fluxes, and fining agents and the like may be included in the glasses treated according to the instant invention; however, such additions should be made only in quantities which do not adversely affect phase separation or leaching. Generally, minor quantities of alumina and $P_2O_5$ may be present without introducing an adverse result. Also, typical fining agents such as $Sb_2O_3$, NaCl, and the like may be included, if desired, without altering the characteristics of the glass.

This invention provides for rapid leaching of very small particles or fibers of a phase-separated glass having a continuous, leachable phase. The invention further provides a fiberizing process for forming very effective microporous tobacco smoke filters.

EXAMPLE I

Porous Fiber Glass Filter

Fibers were prepared having the following calculated composition:

| Oxide | Weight Percent |
| --- | --- |
| $Na_2O$ | 5 |
| $B_2O_3$ | 20 |
| $SiO_2$ | 75 |

Raw materials for this glass were melted and fritted. The fritted glass was then remelted at about 2,800° F. in a small crucible above a bushing having an orifice of about 6 microns diameter. The glass was held at about 2,800° F. for about 1 hour before fibers were drawn. Fiber drawing conditions were a drawing speed of 5,000 feet per minute at a bushing temperature of 1,287.8° C. during one run and a speed of 5,500 feet per minute at 1,321.1° C. bushing temperature during another run. The fibers produced by both runs were substantially identical, having a diameter of about 6 microns.

The fibers were cut into lengths of about 6 to 9 inches and spread out into a mat for heat treating. Heat treating was conducted at 575° C. for 5 hours to bring about phase separation. The fibers were then cooled to room temperature and leached in 3 normal hydrochloric acid at 98° C. for about 1½ hours. The fibers were then thoroughly washed with water.

The resulting fibers had interconnecting pores of about 75 angstroms in diameter, as determined from electron micrographs, and a chemical composition of about 95 percent by weight $SiO_2$, 5 percent by weight $B_2O_3$, and 0.1 percent by weight $Na_2O$. The pore volume was between 20 and 25 percent. The surface area of the porous fibers was about 137 square meters per gram as determined by nitrogen absorption according to the method described by Emmet, Brunauer, and Teller in *Journal of the American Chemical Society* 56, 35 (1934) and 57, 1954 (1935).

The effectiveness of these porous fibers as tobacco smoke filters was tested by preparing Winston cigarettes with a loosely packed porous fiber glass filter element 20 millimeters in length. These cigarettes were compared with a regular cellulose acetate filter and a non-porous fiber glass filter of fiber glass which had not been phase separated and leached. These filters were also 20 millimeters in length. The following table shows the results:

TABLE I

| Cigarette | Filter | $\Delta P$,[1] cm. of water | Average puffs | Particulate matter passed through[2] mg. |
|---|---|---|---|---|
| Winston | Cellulose acetate | 9.7 | 10 | 22.3 |
| Do | Porous fiber glass | 9.8 | 10 | 16.4 |
| Do | Regular fiber glass[3] | 9.7 | 10 | 17.3 |
| Do | No filter | 4.0 | 10 | 35–36 |

[1] The pressure drop shown is across the entire cigarette, including the filter.
[2] Average of 10 cigarettes for each type of filter.
[3] Regular, non-porous fiber glass of the same composition without phase separation and leaching has a surface area of about 6 m.²/gm.

The porous fiber glass proved to be significantly more effective in removing tars and nicotine than the commercial grade cellulose acetate filter and was the non-porous fiber glass (non-porous) filter. Regular non-porous fiber glass has a nitrogen surface area of about 6 square meters per gram while the porous fiber glass utilized in this example had a nitrogen surface area of about 137 square meters per gram.

EXAMPLE II

The following table sets forth the results of fibers submitted to various heat treating conditions and leaching conditions. The fibers were prepared from a glass having a calculated composition of 75 percent by weight $SiO_2$, 20 percent by weight $B_2O_3$, and 5 percent by weight $Na_2O$. The fibers were melted and drawn in the method described in the above example and had an average diameter of about 6 microns.

Many of the samples were prepared by matting in water or methanol. This comprises placing short lengths, e.g., 3 inches to 24 inches, of fibers in a container of water or other liquid, agitating mildly, and drawing off a mat of the fibers. The mat of fibers utilized in the above examples generally had a thickness of about 2 mils. Several of the samples, for example, samples 5 and 7, were not matted. Sample 6 was matted in methanol to determine if any leaching of the alkali in the glass fiber occurred during the water-matting stage. It is noted that the weight loss was greater for the methanol-matted sample than for the water-matted samples.

Although the following table does not indicate, the samples were dried after being washed with water and before being weighed. Also, the water-matted and methanol-matted samples were dried thoroughly before being weighed.

The composition of the phase-separated, leached fibers, that is, all samples other than samples 8 and 9, had a composition of about 96 percent by weight silica, 3.8% $B_2O_3$, and 0.2% $Na_2O$. Samples which had the lowest weight loss would be slightly richer in $B_2O_3$ and $Na_2O$ while those samples having the greatest weight loss would contain less $B_2O_3$ and $Na_2O$.

The heat treatment was conducted in a small furnace which was heated to the temperature indicated. A door of the furnace was then opened and the sample was placed in the furnace for the period of time indicated. Thus, the actual time the sample spends at the heat treating temperature is slightly less than that indicated above. At higher temperatures than 627° C. and with more efficient heating means, a phase-separation time of less than 5 minutes is possible.

Samples 8 and 9 were leached without any prior treatment to illustrate the difference in weight loss between a sample which has not been phase separated into an acid-soluble, borate-rich phase. The weight loss of these two samples is primarily boric oxide and soda present near the surface of the fiber.

All of the above samples, except samples 8 and 9, had interconnecting pores having a diameter greater than about 40 angstroms after heat treating and leaching.

EXAMPLE III

The following table sets forth the results of fibers submitted to various heat treating and leaching conditions. The fibers were prepared from a glass having a calculated composition of about 75 percent by weight $SiO_2$, 20 percent by weight $B_2O_3$, and 5 percent by weight $Na_2O$. The fibers were melted and drawn in the method described in Example I and had an average diameter of about 6 microns.

TABLE III

| Sample | Heat Treatment Time (min.) | Heat Treatment Temp. (°C.) | Leaching Time (min.) | Leaching Temp. (°C.) | Sample Weight (grams) | Weight Loss (%) |
|---|---|---|---|---|---|---|
| 1 | 1 min. | 650 | 3 min. | 100 | 0.1248 | 19.5 |
| 2 | 2 min. | 650 | 3 min. | 98 | 0.1466 | 18.7 |
| 3 | 3 min. | 650 | 3 min. | 97 | 0.1071 | 20.8 |
| 4 | 4 min. | 650 | 3 min. | 95 | 0.1443 | 20.0 |
| 5 | — | — | 3 min. | 95 | 0.1064 | 1.9 |
| 6 | 1 min. | 650 | 1 min. | 100 | 0.1260 | 8.6 |
| 7 | 2 min. | 650 | 1 min. | 98 | 0.1390 | 12.5 |
| 8 | 2 min. | 650 | 2 min. | 97 | 0.1444 | 15.3 |
| 9 | 2 min. | 650 | 3 min. | 96 | 0.1415 | 19.5 |

In the above table, all samples were prepared by matting short lengths of fibers, e.g., 3 inches to about 24 inches, in water and drawing off a mat of about 2 mils (50 microns) in thickness. The samples were then dried at room temperature before being inserted into a furnace for heat treating.

The times recorded above represent the residence time in the heat treating furnace or leaching bath. The fibers have excellent thermal efficiency inasmuch as a residence time of 1 minute in furnace at a furnace temperature of 650° C. causes considerable phase separation. Since some finite time is required for the fiber to attain a minimum phase-separation temperature, which is preferably about 450° C., the fibers could be heat treated for even short periods of time where more efficient heating means were used, e.g., the use of the

TABLE II

| Sample | Preparation | Heat treatment Time, hrs. | Heat treatment Temp., °C. | Leaching Time, min. | Leaching Temp., °C. | (3N HCl) washing time, cold H₂O, min. | Sample weight (Before leaching), g. | Weight loss, percent |
|---|---|---|---|---|---|---|---|---|
| 1 | H₂O matted (2 mil) 50 cc | 4 | 580 | 5 | 98 | 10 | 0.285 | 22.4 |
| 2 | do | 4 | 580 | 10 | 94 | 15 | 0.383 | 24.1 |
| 3 | do | 4 | 580 | 20 | 95 | 20 | 0.452 | 25.8 |
| 4 | do | 4 | 580 | 34 | 98 | 20 | 0.404 | 27.0 |
| 5 | No H₂O mat, fluff | 24 | 580 | 10 | 98 | 20 | 0.248 | 24.5 |
| 6 | Methanol matted (2 mil) | 5 | 580 | 10 | 98 | 20 | 0.343 | 30.5 |
| 7 | No H₂O mat, fluff | 5 | 580 | 10 | 97 | 20 | 0.269 | 26.1 |
| 8 | H₂O matted (2 mil) | None | None | 14 | 97 | 20 | 0.312 | 2.1 |
| 9 | do | None | None | 10 | 95 | 10 | 0.341 | 4.2 |
|  |  | Time, min. |  |  |  |  |  |  |
| 10 | do | 5 | 627 | 10 | 98 | 10 | 0.255 | 22.0 |
| 11 | do | 10 | 627 | 10 | 95 | 10 | 0.297 | 20.2 |
| 12 | do | 30 | 627 | 10 | 94 | 10 | 0.259 | 23.8 |
| 13 | do | 20 | 627 | 10 | 95 | 10 | 0.257 | 19.8 |
| 14 | do | 5 | 627 | 5 | 98 | 10 | 0.268 | 18.8 |

NOTE.—Glass melted and drawn under same conditions described in first patent application. Glass composition before leaching 75% SiO₂, 20% B₂O₃, and 5% Na₂O; after leaching, 96% SiO₂, 3.8% B₂O₃, and 0.2% Na₂O.

fiber itself as an electrical resistor, or where higher furnace temperatures were utilized to effect faster heat transfer. Single fibers or strands of fibers could be drawn through a furnace or heated electrically in a continuous manner without prior cutting, matting, etc.

After leaching in 3N sulfuric acid at the times and temperatures indicated, all samples were washed in water for 5 minutes and dried before weighing.

Sample No. 5 was not heat treated prior to leaching. The very low weight loss by leaching indicates that leaching proceeds slowly if the sample is not first phase separated. Also, even if a non-phase-separated sample is leached for a sufficient time to remove 10 to 20 percent or more of the sample weight, the finished product is much different in structure. Because of the random nature of leaching in non-phase-separated fibers, the leached fibers generally have little strength and easily crumble unless subsequently heat treated to form a substantially non-porous, high-silica material. Also, unless the fibers are first heat treated to form a minor acid-soluble, substantially continuous phase, the leached product will not contain interconnecting pores.

The fibers set forth in the above table, except sample No.5, after leaching had interconnecting pores of a diameter greater than about 40 angstroms.

Fibers formed of compositions having potassia substituted for soda in the above example behave similarly upon treatment to yield microporous fibers having interconnecting pores. Furthermore, the addition of an alkaline earth oxide such as BaO, CaO, or the like to a composition such as utilized in this example improves the fiber-forming properties.

Nitrogen surface areas of the microporous glass utilized in this invention were determined according to standard techniques. Such techniques are described by S. Brunauer in *The Absorption of Gases and Vapors*, Vol. I, p. 271, Oxford University Press, London (1954).

Methods for determining the quantitative presence of hydroxyl groups on glass surfaces, especially porous glass surfaces, have been described by M. J. D. Low and N. Ramasubramanian, "Infrared Study of the Nature of Hydroxyl Groups on the Surface of Porous Glass," *Journal of Physical Chemistry*, Vol. 70, No. 9, pp. 2,740–2,746, Sept. 1966. The presence of hydroxyl groups on porous glass utilized in this invention was determined according to the techniques described by Low and Ramasurbramanian.

Techniques for determining components in cigarette smoke have been described by R. J. Phillippee, H. Moore, R. G. Honeycutt, and J. M. Ruth, "Some Hydrocarbons of the Gas Phase of Cigarette Smoke," *Analytical Chemistry*, Vol. 36, No. 4, pp. 859–865, Apr. 1964, and by R. J. Phillippee and M. E. Hobbs, "Some Components of the Gas Phase of Cigarette Smoke," *Analytical Chemistry*, Vol. 28, No. 12, pp. 2,002–2,006, Dec. 1965.

Pore size reported hereinabove was determined by photographing a surface of the microporous glass through an electron microscope, physically measuring the pores on the photograph, and then dividing the measurement by the magnification of the microscope.

EXAMPLE IV

Porous fiber glass filters of the type described in Example I were tested in a Winston cigarette for effectiveness in reducing acetaldehyde and acetone gases present in tobacco smoke. The actual quantity of gas present is not reported but the peak height of the gas chromatograph analysis is indicated which is proportional to concentration.

| Sample | Acetaldehyde | Acetone |
| --- | --- | --- |
| Winston cigarette with 20 mm. standard cellulose filter | 78 | 20 |
| Winston cigarette with 20 mm. porous fiber glass filter | 66 | 12 |

The porous fiber glass removed about 15 percent more acetaldehyde and about 40 percent more acetone than the cellulose acetate filter.

While specific examples have been set forth hereinabove to illustrate the invention, the invention is not to be considered limited thereto, but to include all the variations and modifications falling within the scope of the appended claims.

We claim:

1. The method of forming microporous fibers from a phase-separable borosilicate glass comprising
   a. melting said glass,
   b. drawing the glass at elevated temperatures into fibers of about 0.5 to about 20 microns diameter,
   c. phase separating the glass at an elevated temperature below the miscibility temperature of the glass in the range of from about 450° C. to about 750° C. for a sufficient time period to form a silica-rich phase and a substantially continuous borate-rich phase,
   d. cooling the phase-separated glass, and
   e. leaching the glass to remove a sufficient quantity of the borate-rich phase to form microporous fibers having interconnecting pores.

2. The process of claim 1 wherein the glass is an alkali metal borosilicate composition.

3. The process of claim 2 wherein the glass additionally contains an alkaline earth oxide.

4. The process of claim 1 wherein the phase separated glass is leached in acid to remove the borate-rich phase thereby forming a microporous structure comprising in excess of 90 percent by weight silica and having interconnecting pores of a minimum diameter of about 40 angstroms.

5. The process of claim 2 wherein the phase separable alkali metal borosilicate glass comprises less than about 20 percent by weight alkali metal oxide, about 10 to about 40 percent by weight boric acid, and about 70 to about 85 percent by weight silica.

6. The process of claim 5 wherein the alkali metal oxide is soda.

* * * * *